United States Patent
Stockwell et al.

(10) Patent No.: US 8,975,352 B2
(45) Date of Patent: Mar. 10, 2015

(54) COMPOSITIONS AND METHODS FOR SELECTIVE DEPOSITION MODELING

(71) Applicant: 3D Systems, Inc., Rock Hill, SC (US)

(72) Inventors: John Stockwell, Sylmar, CA (US); Pingyong Xu, Valencia, CA (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 14/082,471

(22) Filed: Nov. 18, 2013

(65) Prior Publication Data

US 2014/0076499 A1 Mar. 20, 2014

Related U.S. Application Data

(63) Continuation of application No. 14/041,411, filed on Sep. 30, 2013, now Pat. No. 8,642,692, and a continuation of application No. 12/777,418, filed on May 11, 2010, now Pat. No. 8,575,258.

(60) Provisional application No. 61/177,365, filed on May 12, 2009.

(51) Int. Cl.
*C08F 210/00* (2006.01)
*B29C 63/00* (2006.01)
*B32B 38/10* (2006.01)
(Continued)

(52) U.S. Cl.
CPC .............. *B32B 38/10* (2013.01); *B29C 67/0059* (2013.01); *B29C 71/0009* (2013.01); *C08L 91/08* (2013.01)
USPC ......................................... 526/348; 156/703

(58) Field of Classification Search
CPC B29C 67/0059; B29C 71/0009; B32B 38/10; C08L 91/08

USPC .......................................... 156/703; 526/348
See application file for complete search history.

(56) References Cited

U.S. PATENT DOCUMENTS 3,206,601 A * 9/1965 Gold ............................. 250/318
4,665,492 A 5/1987 Masters
(Continued)

FOREIGN PATENT DOCUMENTS

DE 19537264 4/1997
JP 20041529 1/2004

OTHER PUBLICATIONS

Solidscape: ModelMaker II: Technical Documentation available at http://www.solid-scape.com/mmii_techdoc.html.
3D Systems: "3D Systems Launches Second Wax Pattern Printer" [Online ] Oct. 14, 2008, XP002596932 Retrieved from the Internet: URL http://www.3dsystems.com/newsevents/newsreleases/pdfs/10_14_08_3D_Systems_Launches_Second_Wax_Pattern_Printer.pdf.

(Continued)

*Primary Examiner* — William Cheung

(57) ABSTRACT

There is provided compositions and methods for producing three-dimensional objects by selective deposition modeling with a polar build material and a non-polar support material. The build material comprises a hydrocarbon wax material and a viscosity modifier, and the support material comprises a hydrocarbon alcohol wax material and a viscosity modifier. After the selective deposition modeling process has been completed, the object can be placed in a bath of polar solvent to remove the support material. The particular materials provided herein, and the post-processing methods associated therewith, provide for improved part quality of the three-dimensional object and for improved post-processing techniques. The three-dimensional objects can subsequently be used in a number of applications, such as patterns for investment casting.

10 Claims, 1 Drawing Sheet

(51) Int. Cl.
    *B29C 67/00*    (2006.01)
    *B29C 71/00*    (2006.01)
    *C08L 91/08*    (2006.01)

(56) References Cited

U.S. PATENT DOCUMENTS

| | | |
|---|---|---|
| 5,121,329 A | 6/1992 | Crump |
| 5,134,569 A | 7/1992 | Masters |
| 5,141,680 A | 8/1992 | Almquist et al. |
| 5,216,616 A | 6/1993 | Masters |
| 5,260,009 A | 11/1993 | Penn |
| 5,340,433 A | 8/1994 | Crump |
| 5,506,607 A | 4/1996 | Sanders, Jr. et al. |
| 5,740,051 A | 4/1998 | Sanders, Jr. et al. |
| 5,997,795 A | 12/1999 | Danforth et al. |
| 6,364,986 B1 | 4/2002 | Kieronski |
| 2003/0058605 A1 | 3/2003 | Keser |
| 2003/0092820 A1 | 5/2003 | Schmidt et al. |
| 2005/0015171 A1 | 1/2005 | Cruz-Uribe et al. |
| 2005/0023719 A1 | 2/2005 | Nielsen et al. |
| 2005/0074596 A1 | 4/2005 | Nielsen et al. |

OTHER PUBLICATIONS

3D Systems: "VisiJet CP 200 Build Material" [Online] Nov. 20, 2008, pp. 1-6, XP002596933 Safety Data Sheet, Retrieved from the Internet : URL:http://www.3dsystems.com/products/datafiles/visijet/msds/july08/CP200/24162-S12-00-A_CP_200_SDS_Reach_English_EU.pdf.

3D Systems: "Visijet S 200 Support Material" [Online] Nov. 20, 2008, pp. 1-6, XP002596934 Safety Data Sheet Retrieved from the Internet: URL:http://www.3dsystems.com/products/datafiles/visijet/msds/jul08/S200/24180-S12-00-A_S200_SDS_Reach_English_EU.pdf.

PCT International Search Report for International Application No. PCT/US2010/03429 dated Nov. 9, 2010 (10 pages).

PCT Written Opinion of the International Search Authority for International Application No. PCT/US2010/03429 dated Nov. 9, 2010 (16 pages).

3D Systems: The VisiJet® Materials (Aug. 2011).

English translation of China's Second Office Action for Chinese Application No. 201080020580.0 datde Apr. 9, 2014.

English Translation of First Office Action of Japanese Patent Application No. 2012-510912 dated Oct. 29, 2014 (3 pages).

\* cited by examiner

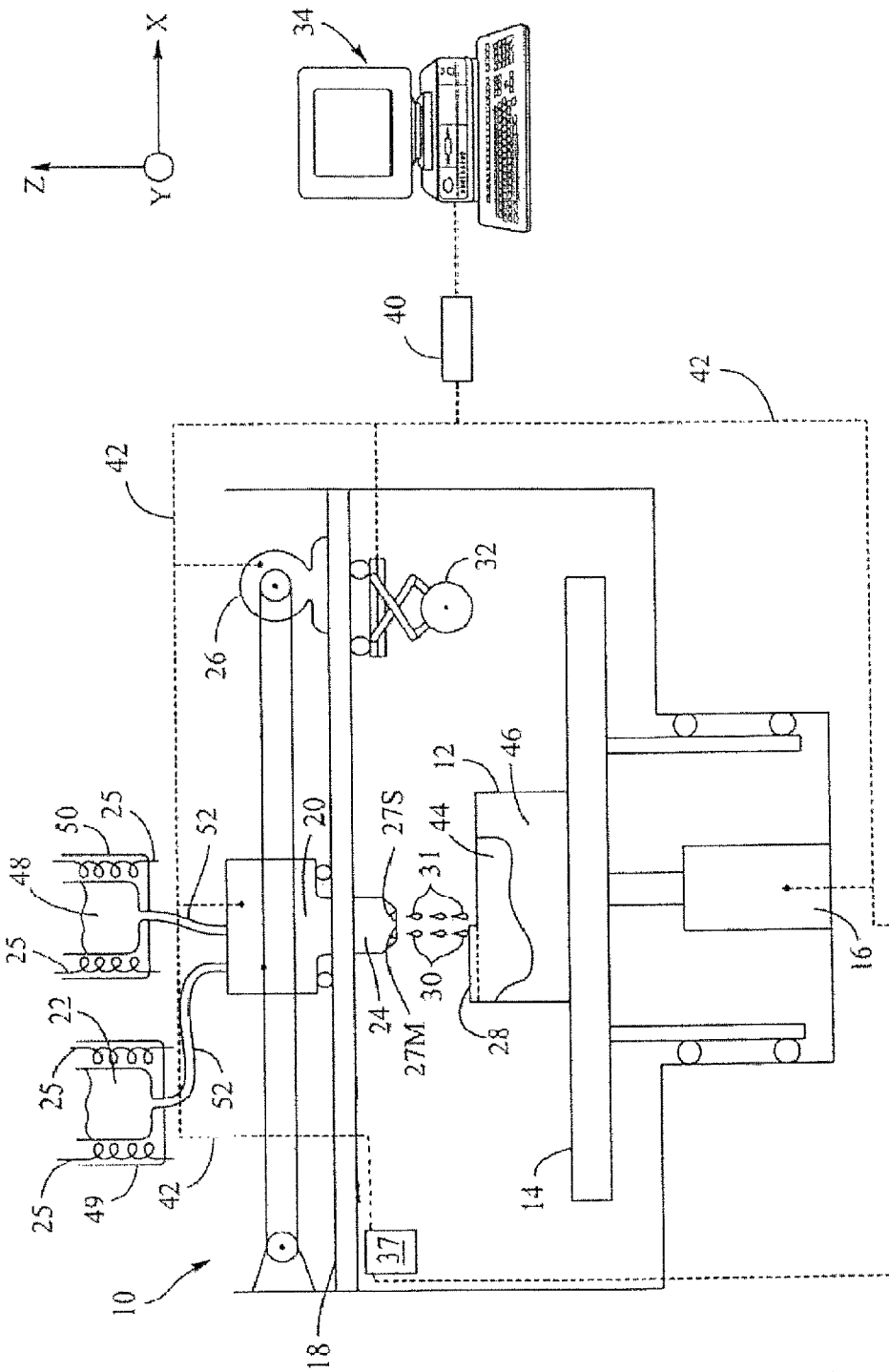

COMPOSITIONS AND METHODS FOR SELECTIVE DEPOSITION MODELING

CROSS REFERENCE TO RELATED APPLICATIONS

This application is a continuation of U.S. patent application Ser. No. 14/041,411, filed on Sep. 30, 2013, now U.S. Pat. No. 8,642,692, which is a continuation of U.S. Pat. No. 8,575,258, issued on Nov. 5, 2013, which claims the benefit of U.S. Provisional Patent Application Ser. No. 61/177,365, filed on May 12, 2009, the entireties of which are hereby incorporated by reference.

FIELD OF THE INVENTION

The present invention is related to compositions and methods for building three-dimensional objects, and more particularly, to wax-based build materials and wax-based support materials, and associated apparatus and methods, for building three-dimensional objects utilizing such materials.

BACKGROUND OF THE INVENTION

Various solid freeform fabrication, or SFF, techniques are commonly used to produce three-dimensional objects. The various approaches are generally characterized by the building up of three-dimensional objects from computer data descriptive of the object in an additive manner from a plurality of formed and adhered layers, each layer representing a cross-section of the three-dimensional object. Typically, successive layers of the object are formed and adhered to a stack of previously formed and adhered layers. According to one SFF technique, an object cross-section is formed by selectively depositing an unsolidified, flowable material onto a working surface in desired patterns which will become part of the object cross-section, and then allowing or causing the material to form the object cross-section and simultaneously adhere to a previously-formed object cross-section. These steps are then repeated to successively build up the three-dimensional object cross-section by cross-section. This approach is referred to as selective deposition modeling (SDM) due to the manner in which object formation occurs.

Typical SDM approaches include Thermal Stereolithography as described in U.S. Pat. No. 5,141,680 to Almquist et al. Also typical of this approach is Fused Deposition Modeling as described in U.S. Pat. Nos. 5,121,329 and 5,340,433 to Crump in which a thermosettable material is dispensed while in a molten state and then hardens after being allowed to cool. Another example is described in U.S. Pat. No. 5,260,009 to Penn. Another example is Ballistic Particle Manufacturing as described in U.S. Pat. Nos. 4,665,492; 5,134,569 and 5,216,616 to Masters, in which particles are directed to specific locations to form object cross-sections.

Thermal stereolithography is particularly suitable for use in an office environment because non-reactive, non-toxic materials can be used. Moreover, the process of forming objects using these materials may not require the use of radiations (e.g. UV radiation, IR radiation and/or laser radiation), heating materials to combustible temperatures (e.g. burning the material along cross-section boundaries), reactive chemicals (e.g. photopolymers) or toxic chemicals (e.g. solvents & the like), complicated cutting machinery, and the like, which can be noisy or pose significant risks if mishandled. Instead, object formation is achieved by heating the material to a flowable temperature then selectively dispensing the material and allowing it to cool.

A critical problem that exists in relation to thermal stereolithography and the like involves finding suitable materials that are capable of being dispensed from the dispensers currently used in such systems (such as an ink jet print head), and which are also capable of forming three-dimensional objects with suitable strength and accuracy once they have been formed. In addition, build materials must be paired with particular support materials to provide the necessary mechanical support for the three-dimensional object to be accurately produced yet allowing for the finished object to be conveniently and safely separated from the support material after the SDM process is complete.

Pattern waxes suitable for use in investment casting are generally not suitable for SDM processes. These materials tend to have high viscosities, relatively low toughness, or other properties which makes them difficult to handle and dispense from multi-orifice ink-jet dispensers such as those which may be used in SDM processes. High material viscosity also reduces the ability to build accurate parts. Previous pattern waxes in the appropriate viscosity range typically exhibit relatively high layer to layer distortion. Further, these previous materials tend to have latent heat properties that are not suitable for quick heat dissipation and fast three-dimensional object building.

For these and other reasons, there is an unmet need for materials suitable for use in SDM which are capable of being jetted through an appropriate dispenser (such as multi-orifice, ink-jet type print head) and have the toughness, handling, and dimensional stability properties appropriate for selective deposition modeling. These materials should also have the properties sufficient for the subsequent use of the three-dimensional object, for example, as a pattern for investment casting processes.

BRIEF SUMMARY OF THE INVENTION

The present invention provides combinations of compositions, as well as associated apparatus and methods, that include a build material and support material for producing three-dimensional objects having material properties and dimensional accuracy suitable for various end uses of the three-dimensional object, including but not limited to investment casting.

One exemplary combination of compositions of the present invention includes a build material that comprises a build hydrocarbon wax material defining a melting temperature of between about 70° C. and about 80° C., wherein the build hydrocarbon wax material comprises between 75% and 85% by weight of the build material. An exemplary build hydrocarbon wax includes paraffin wax. The build material further comprises a build viscosity modifier defining a softening temperature of between about 90° C. and about 145° C. and defining a hydrocarbon resin free of oxygen, wherein the build viscosity modifier comprises between 15% and 25% by weight of the build material. An exemplary build viscosity modifier includes a hydrogenated hydrocarbon resin. The build material defines a viscosity of between about 11 and about 14 centipoise at 80° C. and defines a melting temperature of between about 65° C. and about 85° C. The combination of composition also includes a support material that comprises a support hydrocarbon alcohol wax material defining a melting temperature of between about 52° C. and about 65° C., wherein the support hydrocarbon wax material comprises between 60% and 68% by weight of the support material. Exemplary support hydrocarbon alcohol waxes include octadecanol and hexadecanol. The support material further comprises a support viscosity modifier defining a hydrogenated rosin that comprises between about 60 and about 200 acid number, wherein the support viscosity modifier comprises between 32% and 40% by weight of the support material. An exemplary support viscosity modifier includes a hydrogenated rosin having about 120 acid number. The support material defines a viscosity of between about 11 and about 14 centipoise at 80° C.

Another exemplary embodiment of the present invention includes an apparatus for producing three-dimensional objects using the build material and support material described above. More specifically, the apparatus includes a platform upon which the build material and the support material are selectively dispensed, a dispensing device for selectively dispensing the build material and support material, and supplies for the build material and for the support material for providing the respective material in a generally flowable state to the dispensing device. A further embodiment of the present invention comprises methods for producing a three-dimensional object by selectively dispensing the build material and support material described above, allowing the materials to define a generally solid state, and separating the support material from the build material to provide the three-dimensional object comprising the solidified build material.

Yet another embodiment of the present invention includes a method for separating a three-dimensional object produced with build material from a support material used to support the build material during the production of the three-dimensional object. The method comprises positioning the three-dimensional object and the support material in a bath of polar solvent and then providing an agitation device that agitates the bath of polar solvent with respect to the support material in the bath. The temperature of the polar solvent is controlled to be between about 35° C. and about 50° C., and the three-dimensional object is removed from the bath once substantially all of the support material has been removed. This method may further include the removing of white residue from the object, such as by using a solution of 30% glycerin-alcohol or the like.

Still further embodiments of the invention include additional methods and apparatus for producing and cleaning three-dimensional objects produced by selective deposition modeling as disclosed in the detailed description below.

BRIEF DESCRIPTION OF THE DRAWING

Having thus described the invention in general terms, reference will now be made to the accompanying drawing, which is not necessarily drawn to scale and is meant to be illustrative and not limiting, and wherein FIG. 1 is a diagrammatic side view of an SDM apparatus in accordance with one embodiment of the present invention.

DETAILED DESCRIPTION OF THE INVENTION

The present invention now will be described more fully hereinafter in which some, but not all, embodiments of the invention are described. Indeed, the invention may be embodied in many different forms and should not be construed as limited to the embodiments set forth herein; rather, these embodiments are provided so that this disclosure will satisfy applicable legal requirements. All patents and applications disclosed throughout this application are incorporated by reference herein in their entirety.

The present invention relates to compositions of build materials and support materials used to produce three-dimensional objects by selective deposition modeling, as well as associated apparatus and methods. The build material and support material are phase change materials that are heated to a flowable state in order to be dispensed by the SDM apparatus and are cooled to define a non-flowable state after dispensing. Once the SDM process has been completed, the build (which typically includes the object of build material generally surrounded by the support structure of support material) may be removed from the SDM apparatus and placed in a bath of solvent in order for the support material to be removed from the object of build material. In some embodiments, the build material defines a non-polar material and the support material defines a polar material, such that a polar solvent may be used, with or without agitation, to remove the support material without significantly affecting the accuracy of the object of build material. These and other aspects of the various embodiments of the invention will be described in more detail below.

The term "build material," "support material," or "material" as used herein describes the respective materials dispensed by the dispensing device in order to build the three-dimensional object. The build material includes the materials that constitutes the object being built by the SFF technique, and the support material includes the material that is dispensed to support the object being built and that may ultimately be separated from the object in a post-process operation or the like. Although the embodiments of the build material and support material described herein are phase change materials that do not require curing in order to return to a non-flowable state, it should be appreciated that further embodiments of the invention may include additives in the material(s) that may require curing, such as by a UV source or the like.

As used herein, the term "a flowable state" of a build material is a state wherein the material is unable to resist shear stresses that are induced by a dispensing device, such as those induced by an ink jet print head when dispensing the material, causing the material to move or flow. In certain embodiments of the present invention, the flowable state of the build material is a liquid state. However, the flowable state of the build material may also exhibit thixotropic-like properties. The term "solidified" and "solidifiable" as used herein refer to the phase change characteristics of a material where the material transitions from the flowable state to a non-flowable state.

Also as used herein, a "non-flowable state" of a build material is a state wherein the material is sufficiently self-supportive under its own weight so as to hold its own shape. A build material existing in a solid state, a gel state, or paste state, are examples of a non-flowable state of a build material for the purposes herein.

SDM Apparatus

FIG. 1 is a schematic diagram of an SDM apparatus 10 in accordance with certain embodiments of the present invention. The SDM apparatus 10 is shown building a three-dimensional object 44 on a support structure 46 in a build environment 12. The object 44 and support structure 46 are built in a layer by layer manner on a build platform 14 that can be precisely positioned vertically by any conventional actuation device 16, which in FIG. 1 generally comprises a pneumatic or hydraulic cylinder, but in further embodiments may comprise any actuation device that raises and lowers the build platform.

Directly above and parallel to the platform 14 is a rail system 18 on which a material dispensing trolley 20 resides carrying a dispensing device 24. In certain embodiments of the present invention, the dispensing device 24 is an ink jet print head that dispenses a build material and support material and is of the piezoelectric type having a plurality of dispensing orifices. However, other ink jet print head types could be used, such as an acoustic or electrostatic type, if desired. Alternatively, a thermal spray nozzle could be used instead of an ink jet print head, if desired. An example dispensing device 24 is the piezoelectric Z850 print head. The material dispensed from the Z850 print head desirably has a viscosity of between about 11 to about 14 centipoise at a dispensing temperature of about 80° C. The dispensing methodology of this system is described in greater detail in U.S. Pat. No. 6,841,116 assigned to the assignee of the present invention. Further embodiments of the present invention comprise alternative dispensing devices.

The trolley 20 of FIG. 1 carrying the dispensing device 24 is fed the build material 22 from a remote reservoir 49. The remote reservoir is provided with heaters 25 to bring and maintain the build material in a flowable state. Likewise, the trolley 20 carrying the dispensing device 24 is also fed the support material 48 from remote reservoir 50 in the flowable state. In order to dispense the materials, a heating device is provided to initially heat the materials to the flowable state, and to maintain the materials in the flowable state along its path to the dispensing device. In an example embodiment, the heating device comprises heaters 25 on both reservoirs 49 and 50, and additional heaters (not shown) on the umbilicals 52 connecting the reservoirs to the dispensing device 24.

Located on the dispensing device 24 are discharge orifices 27M and 27S for respectively dispensing build material 30 and support material 31. Discharge orifices 27M and 27S are adapted to dispense their respective materials to any desired target location in the build environment 12.

The dispensing device 24 is reciprocally driven on the rail system 18 along a horizontal path (i.e., along the X-axis) by a conventional drive device 26 such as an electric motor. In some embodiments of the present invention, the trolley carrying the dispensing device 24 takes multiple passes to dispense one complete layer of the materials from discharge orifices 27M and/or 27S.

Layers 28 are sequentially deposited to form object 44. In FIG. 1, a portion of a layer 28 of dispensed build material 30 is shown as the trolley has just started its pass from left to right. FIG. 1 shows the formation of an uppermost layer 28. A bottom-most layer 28 (not shown) resides adjacent platform 14. Dispensed build-material droplets 30 and support material droplets 31 are shown in mid-flight, and the distance between the discharge orifice and the layer 28 of build material is greatly exaggerated for ease of illustration. In certain embodiments of the present invention, the droplets comprise dispensing drops defining a drop mass in the range of between about 40 nanograms and about 60 nanograms, or more preferably of about 50 nanograms and the distance from the dispensing device 24 to the layer 28 being formed is about 0.5 millimeter to about 1.0 millimeter. The layer 28 formed defines a height of between about 0.015 inches to 0.040 inches, or more preferably of about 0.025 inches (the height being defined by the distance between the lower surface of the planarizer and the top surface of the previously deposited layer). The layer 28 may be all build material, all support material, or a combination of build and support material, as needed, in order to form and support the three-dimensional object.

The build material and support material are dispensed as discrete liquid droplets in the flowable state, which solidify upon contact with the layer 28 as a result of a phase change. Alternatively, the materials may be dispensed in a continuous stream in an SDM apparatus, if desired. Each layer 28 of the object 44 is divided into a plurality of pixels on a bit map, in which case a target location is assigned to the pixel locations of the object for depositing the build material 22. Likewise, pixel coordinates located outside of the object may be targeted for deposition of the support material 48 to form the supports for the object 44 as needed. Generally, once the discrete liquid droplets are deposited on all the targeted pixel locations of the bit map for a given layer, the dispensing of material for forming the layer is complete, and an initial thickness of layer 28 is established. In certain embodiments of the present invention, the initial layer thickness is greater than the final layer thickness.

A planarizer 32 is then drawn across the layer to smooth the layer and normalize the layer to establish the final layer thickness (see FIG. 3, discussed below). The planarizer 32 is used to normalize the layers as needed in order to eliminate the accumulated effects of drop volume variation, thermal distortion, and the like, which occur during the build process. It is the function of the planarizer to melt, transfer, and remove portions of the dispensed layer of build material in order to smooth it out and set a desired thickness for the layer. This ensures a uniform surface topography and layer thickness for all the layers that form the three-dimensional object and the support structure. However, it produces waste material that must be removed from the system. The planarizer 32 may be mounted to the material dispensing trolley 20 if desired, or mounted separately on the rail system 18 (as shown in FIG. 1). Alternatively, the layers can be normalized by utilizing capillary action to remove excess material, as disclosed in U.S. Pat. No. 6,562,269, assigned to the assignee of the present invention, or an active surface scanning system that provides feedback data that can be used to selectively dispense additional material in low areas to form a uniform layer as disclosed in U.S. Pat. No. 6,492,651, also assigned to the assignee of the present invention.

A waste collection system (not shown) is used to collect the excess material generated during planarizing. The waste collection system may comprise an umbilical that delivers the material to a waste tank or waste cartridge, if desired. A waste system for curable phase change materials is disclosed in U.S. Pat. No. 6,902,246, assigned to the assignee of the present invention.

A power supply 37 provides electrical power to at least the actuation device 16, the planarizer 32, the computer controller 40 (connected to external computer 34), the drive device 26, and the dispensing device 24, as well as the heaters 25 for initially heating the build material and support material into a flowable state and the heated umbilicals 52 for keeping the respective material in a flowable state. Still further features common to SDM apparatus may be provided, including, but not limited to, a curing device for selectively curing materials that may include photopolymers or photoinitiators as a component in the material.

Build Material

Turning now to the build material of the present invention, the build material comprises a build hydrocarbon wax and at least one build viscosity modifier (also known as a tackifier). In order for the build material to be properly dispensed through the dispensing device in some embodiments of the present invention, the build material defines a viscosity of between about 11 and about 14 centipoise at 80° C., or more preferably a viscosity of between about 12 and about 13 centipoise at 80° C. The build material of some embodiments also defines a melting temperature of between about 65° C. and about 85° C.

The build hydrocarbon wax of certain embodiments defines a melting temperature of between about 70° C. and about 80° C. Example build hydrocarbon waxes include, but are not limited to paraffin wax (one example being HM Paraffin provided by Koster Keunen LLC.

The build viscosity modifier of certain embodiments defines a softening temperature of between about 90° C. and about 145° C., or more preferably between about 115° C. and about 125° C. The build viscosity modifier of certain embodiments defines a hydrocarbon resin free of oxygen, such as a hydrogenated hydrocarbon resin (some examples being Arkon P-125, Arkon P-100, Arkon P-90, and combinations thereof, which are alicyclic hydrocarbon resin tackifiers available from Arakawa Chemical Inc.); whereas further embodiments provide alternative build viscosity modifiers that include, but are not limited to, Foralyn 90 Ester of Hydrogenated Rosin and Foralyn 110 Ester of Hydrogenated Rosin, both of which are available from EASTMAN Chemical BV.

Various embodiments of the build material comprise between 75% and 85% by weight of build hydrocarbon wax material and between 15% and 25% by weight of build viscosity modifier. One non-limiting example formulation of build material comprises about 81% build hydrocarbon wax and about 19% build viscosity modifier in order to adjust the viscosity of the build material to be 12 centipoise at 80° C. The formulations for both the build material and the support material of certain embodiments of the present invention include a variable amount of viscosity modifier in order that the build material and support material will have particular viscosities in order that they may be dispensed in a controlled and consistent manner. Therefore, the relative percentage of viscosity modifier will be governed by the desired viscosity for such embodiments of the present invention.

Still further embodiments of the present invention include build materials that include alternative phase change materials and may include additional materials such as waxes, resins, diluents, fillers, photoinitiators, polymerization inhibitors, and other additives known in the art.

Support Material

Turning now to the support material of the present invention, the support material comprises a support hydrocarbon alcohol wax and at least one support viscosity modifier. In order for the support material to be properly dispensed through the dispensing device in some embodiments of the present invention, the support material defines a viscosity of between about 11 and about 14 centipoise at 80° C., or more preferably a viscosity of between about 12 and about 13 centipoise at 80° C.

The support hydrocarbon alcohol wax of certain embodiments defines a melting temperature of between about 52° C. and about 65° C. Example support hydrocarbon alcohol waxes include, but are not limited to octadecanol and hexadecanol.

The support viscosity modifier of certain embodiments defines a hydrogenated rosin that comprises between about 60 and about 200 acid number, or more preferably between about 100 and about 150 acid number, and still more preferably about 120 acid number. Example support viscosity modifiers include, but are not limited to, tackifiers such as Pinecrystal KR-610 available from Arakawa Chemical Inc. or Foralyn E available from Eastman Chemical Company.

Various embodiments of the support material comprise between 60% and 68% by weight of support hydrocarbon alcohol wax material and between 32% and 40% by weight of support viscosity modifier. One non-limiting example formulation of support material comprises about 65% support hydrocarbon alcohol wax and 35% support viscosity modifier in order to adjust the viscosity of the support material to be 12.5 centipoise at 80° C. Still further embodiments of the present invention include support materials that include alternative phase change materials and may include additional materials such as waxes, resins, diluents, fillers, photoinitiators, polymerization inhibitors, and other additives known in the art. Preferably, such alternative and/or additional materials do not adversely affect the ability of the support material to be removed from the build material during the post-processing operations.

Post-Processing

After the three-dimensional object has been produced by the SDM apparatus, it should be removed from the support material surrounding the object. Accordingly, methods for separating the three-dimensional object from the support material are provided. The methods includes removing the three-dimensional object and support material, typically while still connected to the platform, from the SDM apparatus and positioning the build and platform in a both of polar solvent. Because the build material of the three-dimensional object is a non-polar material, it is generally unaffected by the polar solvent. However, because the support material is a polar material, the polar solvent causes the support material to break down and separate from the build material. The bath may include an agitation device that agitates the solvent in order to expedite the removal of the support material, and the temperature of the bath is controlled to be between about 35° C. and about 50° C., or more preferably between about 42° C. and about 50° C., which also expedites the removal of the support material. Using this process, relatively small parts, such as jewelry parts, can be cleaned in about 15 to 30 minutes.

The polar solvent provided in the bath can comprise any polar material and includes, but is not limited to, poly(propylene) glycol, ethanol, 91% isopropyl alcohol, and 100% isopropyl alcohol. After the three-dimensional object has been removed from the bath after the support material has been substantially removed, the three-dimensional object may have a white residue on its outer surfaces. The object can be rinsed with a solution comprising about 30% glycerin-alcohol in order to remove the white residue from the object surfaces. Still further post-processing operations may be undertaken with the object prior to its subsequent use in investment casting or other applications.

EXAMPLES

The following materials are exemplary build material (WM-134A) and support material (WS-114B) formulations:

|  | % |
|---|---|
| WM-134A |  |
| HM Paraffin | 76.82 |
| Arkon P-100 | 17.09 |
| Arkon P-90 | 6.09 |
| Total | 100 |
| WS-114B |  |
| Octadecanol | 65 |
| KR-610 | 35 |
| Total | 100 |

The viscosity of each material is 12 cps at 80° C. The parts built with WM-134A build material and WS-114B support material cleaned with the post process described above have high resolution and good castability for various metal casting process, including gold, silver, aluminum and steel alloys, etc. However, it was noticed that the parts built with WM-134A material have relatively narrow post processing window, which means the post processing temperature has to be controlled in a relatively narrow range, otherwise the resolution of the parts, especially for fine feature parts, may be affected. In order to improve post process window, formulation WM-P125 was developed to include 81% HM Paraffin and 19% Arkon P-125 to have a viscosity of 12 cps at 80° C.; and the parts built with WM-P125 (and supported by WS-114B) can be cleaned at relatively high temperature without scarifying resolution, which makes post processing window wide and post processing time much shorter. Further embodiments of the present invention include alternative formulations in order to provide the appropriate part resolution and/or desired process window.

Accordingly, the present invention provides for the production of three-dimensional objects with improved build and support materials. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

That which is claimed:

1. A method of separating a three-dimensional object produced with build material from a support material used to support the build material during the production of the three-dimensional object, the method comprising:

positioning the three-dimensional object and the support material in a bath of polar solvent;

agitating the bath of polar solvent with respect to the support material in the bath; and removing a white residue from the three-dimensional object.

2. The method of claim 1, wherein removing the white residue comprises removing the object from the bath of polar solvent and rinsing the object with a solution comprising about 30% glycerin-alcohol.

3. The method of claim 1, wherein the bath of polar solvent comprises one or more of poly(propylene)glycol, ethanol, and isopropyl alcohol.

4. A method of separating a three-dimensional object produced with build material from a support material used to support the build material during the production of the three-dimensional object, the method comprising:

positioning the three-dimensional object and the support material in a bath of polar solvent; and agitating the bath of polar solvent with respect to the support material in the bath, wherein the bath of polar solvent comprises 91% isopropyl alcohol.

5. The method of claim 3, wherein the bath of polar solvent comprises 100% isopropyl alcohol.

6. A method of separating a three-dimensional object produced with build material from a support material used to support the build material during the production of the three-dimensional object, the method comprising:

positioning the three-dimensional object and the support material in a bath of polar solvent; and agitating the bath of polar solvent with respect to the support material in the bath, wherein the temperature of the polar solvent is controlled to be between about 35° C. and about 50° C.

7. A method of separating a three-dimensional object produced with build material from a support material used to support the build material during the production of the three-dimensional object, the method comprising:

positioning the three-dimensional object and the support material in a bath of polar solvent; and agitating the bath of polar solvent with respect to the support material in the bath, wherein the temperature of the polar solvent is controlled to be between about 42° C. and about 50° C.

8. The method of claim 1, wherein the bath of polar solvent comprises 91% isopropyl alcohol.

9. The method of claim 1, wherein the temperature of the polar solvent is controlled to be between about 35° C. and about 50° C.

10. The method of claim 1, wherein the temperature of the polar solvent is controlled to be between about 42° C. and about 50° C.

* * * * *